US009996248B2

(12) United States Patent
Park et al.

(10) Patent No.: US 9,996,248 B2
(45) Date of Patent: Jun. 12, 2018

(54) APPARATUS AND METHOD FOR PROVIDING PRIVATE CHAT IN GROUP CHAT

(71) Applicant: Samsung Electronics Co., Ltd., Gyeonggi-do (KR)

(72) Inventors: Tae-Gun Park, Gyeonggi-do (KR); Wan-Kyu Park, Gyeonggi-do (KR); Jang-Seok Seo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 636 days.

(21) Appl. No.: 14/146,123

(22) Filed: Jan. 2, 2014

(65) Prior Publication Data
US 2014/0298210 A1    Oct. 2, 2014

(30) Foreign Application Priority Data

Apr. 2, 2013 (KR) .................. 10-2013-0035582

(51) Int. Cl.
*G06F 3/048* (2013.01)
*G06F 3/0487* (2013.01)
(Continued)

(52) U.S. Cl.
CPC .......... *G06F 3/0487* (2013.01); *G06F 3/0486* (2013.01); *H04L 12/1822* (2013.01); *H04L 12/185* (2013.01)

(58) Field of Classification Search
CPC ....... H04L 12/58; H04L 12/588; H04L 51/04; H04L 51/32; H04L 12/1822;
(Continued)

(56) References Cited

U.S. PATENT DOCUMENTS 6,677,968 B1 * 1/2004 Appelman ............. G06Q 10/10
709/210
7,603,413 B1 * 10/2009 Herold .................. G06Q 10/10
455/466
(Continued)

FOREIGN PATENT DOCUMENTS

CN        101345718 A       1/2009
CN        101883057 A       11/2010
(Continued)

OTHER PUBLICATIONS

Quick Start Guide Logging into Your Meeting, Web Meeting Login Quick Start Guide, Jan. 29, 2013, www.webmeetinglogin.com, XP055128718.
(Continued)

*Primary Examiner* — Tadesse Hailu
(74) *Attorney, Agent, or Firm* — Cha & Reiter, LLC

(57) ABSTRACT

An apparatus and a method for providing a private chat in a group chat without having to switch between respective display screens. In the method, at least one group chat participant selected from group chat counterparts is designated as a private chat participant, identification information regarding the private chat participant is displayed in a message input window of a group chat window which is commonly used in a group chat and a private chat. Moreover, a group chat participant corresponding to the motion, such as a drag motion or tap motion is designated as a private chat participant, when a drag motion from a chat log of at least one group chat counterpart displayed in a chat log window to the message input window is detected.

24 Claims, 11 Drawing Sheets

(51) Int. Cl.
*G06F 3/0486* (2013.01)
*H04L 12/18* (2006.01)

(58) Field of Classification Search
CPC ... H04L 65/403; H04L 51/16; H04L 12/1813; H04M 3/42365
See application file for complete search history.

(56) References Cited

U.S. PATENT DOCUMENTS

| | | | | |
|---|---|---|---|---|
| 8,819,154 | B2* | 8/2014 | Al-Asaaed | H04L 51/10 348/14.01 |
| 8,825,778 | B2* | 9/2014 | DeLuca | H04L 51/16 709/204 |
| 8,832,212 | B1* | 9/2014 | Shah | H04L 51/32 709/206 |
| 2010/0005402 | A1* | 1/2010 | George | H04L 51/04 715/758 |
| 2010/0235758 | A1 | 9/2010 | Shen | |
| 2010/0267369 | A1* | 10/2010 | Lim | H04L 12/1822 455/414.1 |
| 2011/0080356 | A1* | 4/2011 | Kang | G06F 3/0486 345/173 |
| 2011/0270922 | A1 | 11/2011 | Jones et al. | |
| 2012/0144318 | A1* | 6/2012 | Khadilkar | H04L 51/20 715/753 |
| 2012/0306927 | A1* | 12/2012 | Lee | G06F 3/041 345/660 |
| 2013/0069969 | A1* | 3/2013 | Chang | H04L 12/581 345/589 |
| 2013/0072262 | A1* | 3/2013 | Mhun | H04M 1/72552 455/566 |
| 2013/0091443 | A1* | 4/2013 | Park | G06F 3/0485 715/758 |
| 2014/0019885 | A1* | 1/2014 | Jung | G06F 3/0481 715/758 |
| 2014/0173003 | A1* | 6/2014 | Van | H04L 67/306 709/206 |

FOREIGN PATENT DOCUMENTS

| | | |
|---|---|---|
| CN | 102789508 A | 11/2012 |
| EP | 2 571 234 A1 | 3/2013 |
| KR | 10-2009-0047835 A | 5/2009 |
| KR | 10-2009-0099410 A | 9/2009 |
| WO | 2012/092025 A2 | 7/2012 |

OTHER PUBLICATIONS

Chinese Search Report dated Jan. 10, 2018.

* cited by examiner

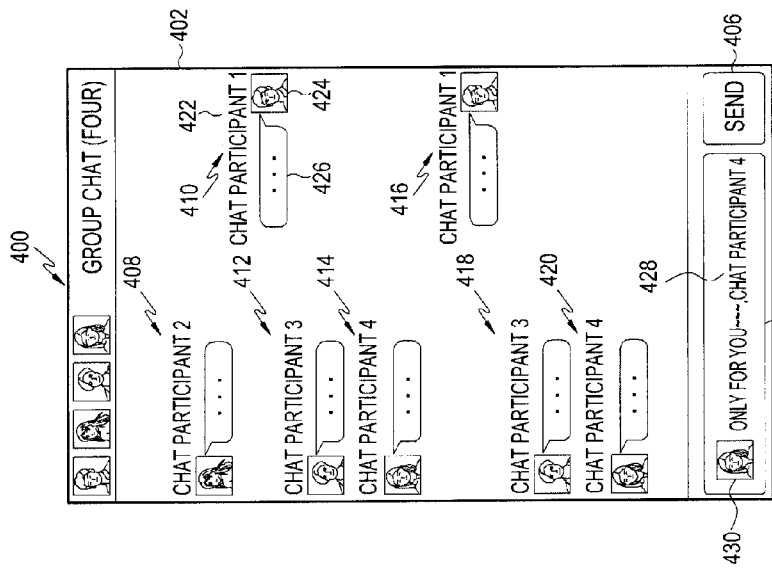
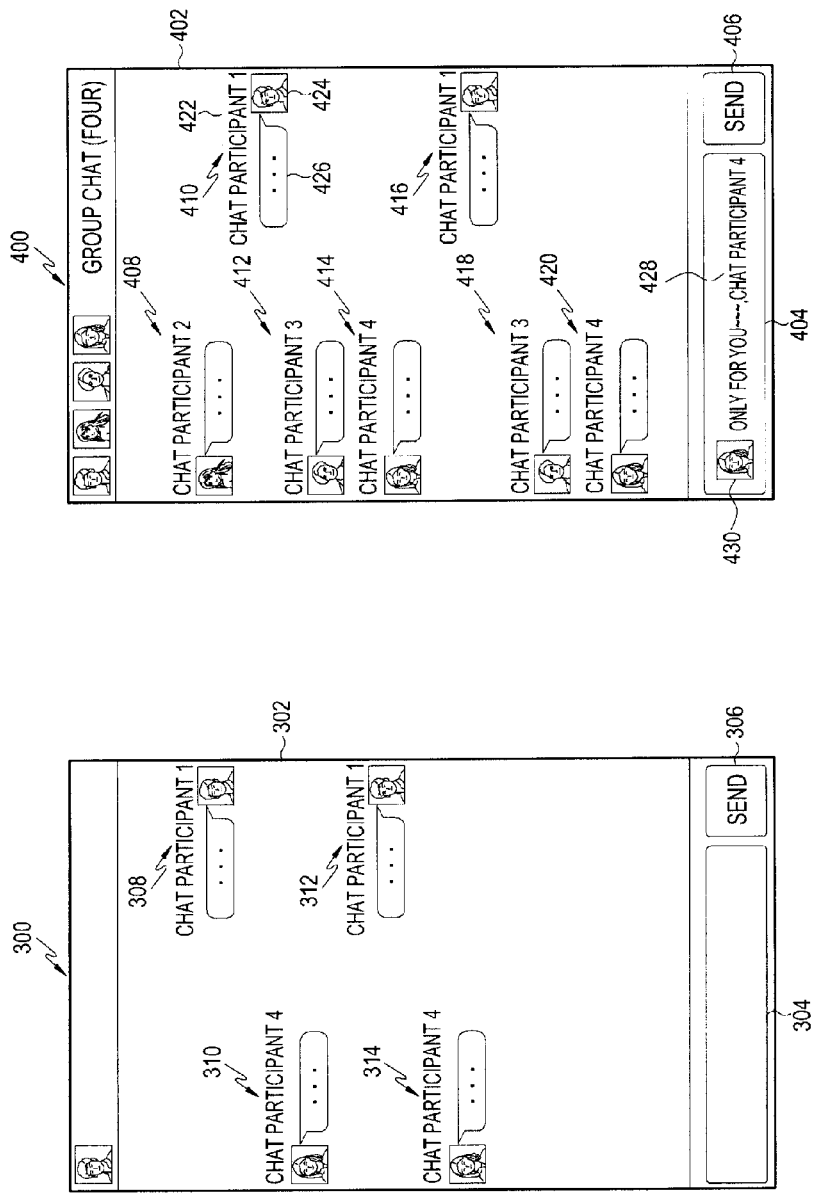
FIG.4
FIG.3
(PRIOR ART)

APPARATUS AND METHOD FOR PROVIDING PRIVATE CHAT IN GROUP CHAT

CLAIM OF PRIORITY

This application claims the priority under 35 U.S.C. § 119(a) from Korean Application Serial No. 10-2013-0035582, which was filed in the Korean Intellectual Property Office on Apr. 2, 2013, the entire content of which is hereby incorporated by reference in its entirety.

BACKGROUND

1. Technical Field

The present disclosure relates to an apparatus and a method for providing a private chat during a group chat.

2. Description of the Related Art

In recent years, electronic devices such as mobile terminals, and particularly smart phones have become increasingly popular, a message sending service (hereinafter, referred to as 'messenger service') such as a Short Message Service (SMS), and an instant messenger is acquiring a huge popularity for use in mobile terminals as well as in a personal computers and many other devices capable of such communication. In this way, users of the mobile terminal are making use of more various chat functions now than ever before.

A general messenger service provides a group chat function referred to as 'one to N chat'. The group chat function corresponds to a function by which messages are exchanged between group chat participants within in a specific group. In the group chat, messages which one group chat participant sends are commonly sent to the other group chat participants. Accordingly, the messages exchanged between the group chat participants are viewable by all group chat participants.

Moreover, the general messenger service provides a private chat function referred to as 'one to one chat'. The private chat function corresponds to a function by which messages are privately exchanged between some (typically two) of the group chat participants of the specific group. For example, the one to one chat is performed between two private chat participants participating in the one to one chat, out of the group of chat participants. The messages exchanged between the private chat participants participating in the private chat that occur concurrently during the group chat are not sent to the other group chat participants in addition to the private chat participants. Accordingly, the messages exchanged between the private chat participants are not viewable by the other group chat participants, as the intent of private chat is just that, between for example, two participants in a one to one chat.

When the group chat function of the messenger service is executed in the mobile terminal, a group chat window is displayed on a display of the mobile terminal. Through the group chat window, users can identify not only the group chat participants participating in the group chat but also the messages exchanged between the group chat participants. Moreover, the users can input a message and send the input message to the group chat participants through a message input window of the group chat window.

When a user wants to send a message only to a specific group chat participant out of the group chat participants during the group chat, the user selects the desired group chat participant, and requests the private chat. Then, a private chat window is displayed on the display of the mobile terminal. Generally, in the messenger service, the group chat window and the private chat window are separately provided.

Accordingly, when the user wants to simultaneously participate in the group chat and the private chat, the user must separately view the group chat window screen and the private chat window screen, and must separately participate in the group chat or the private chat. In general, in the mobile terminal, the group chat window and the private chat window are not simultaneously displayed, and only one chat window which the user selects is displayed. In other words, when the user attempts to access the private chat, while viewing or participating in the group chat through the group chat window, the group chat window disappears, and the private chat window is displayed instead of the group chat window. When the user selects the group chat in order to view or participate in the group chat, while viewing or participating in the private chat through the private chat window, the private chat window disappears, and the group chat window is displayed instead of the private chat window. In such a case as described above, the user must view or participate in the group chat and the private chat, while shuttling between the group chat window and the private chat window. In addition, the user has trouble in properly participating in the group chat and the private chat, while viewing the flow of the group chat and the private chat.

Furthermore, the general messenger service must prescribe the private chat participant of the group chat counterparts, through the private chat designation window during the group chat. The private chat designation window is provided as a separate screen, distinguished from the group chat window and the private chat window. When the user selects the group chat participant with whom the user desires to perform the private chat, through the group chat window, the group chat window disappears, and the separate private chat designation window is displayed instead of the group chat window. When the user designates the group chat participant with whom the user desires to perform the private chat, as a private chat participant through the private chat designation window, the private chat designation window disappears, and the private chat window is displayed instead of the private chat designation window. In this way, the user must designate the private chat participant through the separate private chat designation window in addition to the group chat window.

SUMMARY

Accordingly, an aspect of the present invention is to provide an apparatus and a method for providing a private chat which enables the user to simply and conveniently perform a group chat and a private chat.

Another aspect of the present invention is to provide an apparatus and a method for providing a private chat in which a group chat and a private chat progress together through one window screen.

Still another aspect of the present invention is to provide an apparatus and a method for providing a private chat which enable the user to simply and conveniently designate a private chat participant during the group chat to participate in the private chat.

In accordance with one aspect of the present invention, an apparatus for providing a private chat in a group chat may include: a display which displays a group chat window which comprises a chat log window and a message input window, and displays the group chat and the private chat together on a display screen of the display; and a controller which designates at least one group chat participant selected from the group chat counterparts as a private chat participant, and displays identification information regarding the private chat participant in a message input window.

In accordance with another aspect of the present invention, an apparatus for providing a private chat in a group chat may include: a display which displays a group chat window which comprises a chat log window and a message input window, and displays the group chat and the private chat together on a display screen of the display; and a controller which detects a drag motion from a chat log of at least one group chat counterpart displayed in the chat log window to the message input window, and designates a group chat participant corresponding to the drag motion as a private chat participant.

In accordance with still another aspect of the present invention, a method for providing a private chat in a group chat may include: designating by a controller at least one group chat participant selected from the group chat counterparts as a private chat participant; and displaying by a display unit identification information regarding the private chat participant in a message input window of a group chat window which displays the group chat and the private chat together on a display screen of the display unit.

In accordance with yet another aspect of the present invention, a method for providing a private chat in a group chat may include: detecting a gesture on a group chat window of a touch screen which includes a chat log window and a message input window, and which displays the group chat and the private chat together on a display screen of a display unit; and designating a group chat participant corresponding to the gesture as a private chat participant, in accordance with the gesture being associated with a movement from a chat log of at least one group chat counterpart displayed in the chat log window to the message input window.

BRIEF DESCRIPTION OF THE DRAWINGS

The above and other aspects, features, and advantages of the present invention will be more apparent to a person of ordinary skill in the art from the following detailed description taken in conjunction with the accompanying drawings, in which:

FIG. 3 shows an example of a private chat window according to a conventional messenger service;

FIG. 4 shows an example of a group chat window for providing a private chat in a group chat according to an embodiment of the present invention;

DETAILED DESCRIPTION

Figure 2:
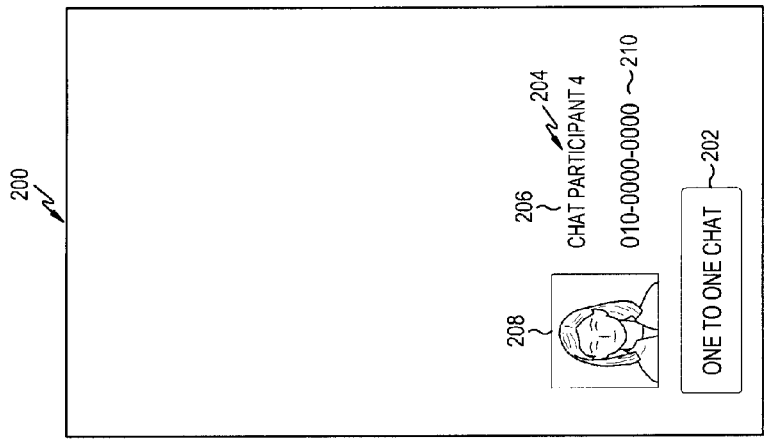
FIG. 2 shows an example of a private chat designation window according to a conventional messenger service.

Hereinafter, the embodiments of the present invention will be described with reference to the accompanying drawings. In the drawings, like elements are provided with like reference numerals. Below descriptions using reference numerals for the accompanying drawings are to assist the artisan with an understanding of the various embodiments of the present invention as being determined by the claims and their equivalents.

Furthermore, although various specific detailed descriptions are included to assist the artisan with an understanding of the various embodiments of the present invention, these descriptions are to be considered illustrative only and do not limit the invention to the illustrations shown and described herein. Accordingly, it will be understood by those skilled in the art that various changes and modifications can be made that are within the breadth of the present invention. Moreover, in describing the present invention, detailed descriptions related to well-known functions or configurations may be omitted for clarity and brevity.

The terms and words used in below descriptions and the claims are not limited to the bibliographic meaning, and are to be used by the inventor to help the artisan with a clear and consistent comprehension of the present invention. Thus, the terms and words should be defined based on the contents over the whole present specification.

Hereinafter, for example, a case where the various embodiments of the present invention are applied to a messenger service which is executed in the mobile terminal including a touch screen display will be described. However, the embodiments of the present invention may be applied to any other of many types of devices having communicative functionality. Moreover, the embodiments of the present invention may be applied to many different devices through modification made by those skilled in the art without departing from the scope of the present invention.

For example, as long as it is capable of providing the messenger service, other devices except for the mobile terminal, for example, personal computers such as a desktop computer, and a laptop computer which include the touch screen display may be an apparatus for providing a private chat according to the embodiments of the present invention.

First, in order to help comprehension of the embodiments of the present invention, a group chat and a private chat according to a conventional messenger service will now be described with reference to FIGS. 1 to 3.

Figure 1:
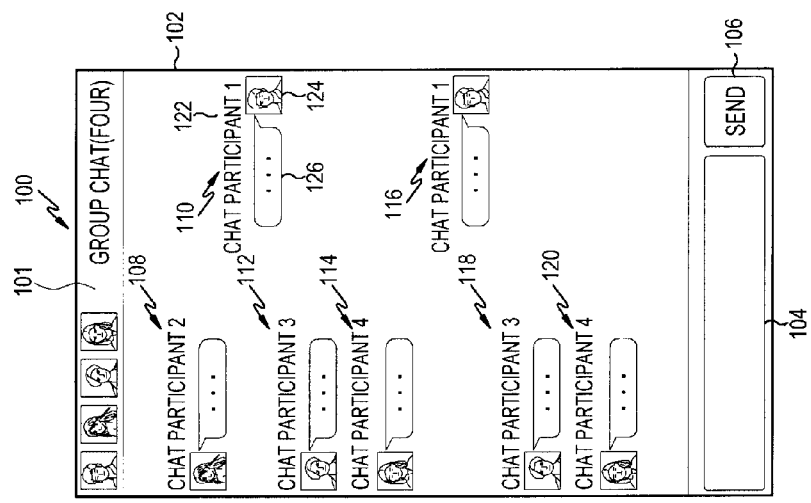
FIG. 1 shows an example of a group chat window according to a conventional messenger service.

FIG. 1 shows an example of a group chat window according to a conventional messenger service. A group chat window 100 shown in FIG. 1 provides an example in which a group chat is in progress in which four group chat participants participate in the group chat. The group chat window 100 may be displayed on a touch screen display of a mobile terminal in which a messenger service is executed.

Referring to FIG. 1, the group chat window 100 includes a chat log window 102, a message input window 104, and a send button 106 marked as 'Send'. Chat logs 108, 110, 112, 114, 116, 118, and 120 are displayed in the chat log window 102. 'Chat participant 1' to 'Chat participant 4' correspond to identifications of the four group chat participants participating in the group chat, respectively, in the chat logs 108, 110, 112, 114, 116, 118, and 120. Although, for convenience of description and for illustrative purposes, the IDs of the group chat participants are marked as 'Chat participant 1' to 'Chat participant 4', respectively, over the whole present specification, names or nicknames which the group chat participants corresponding to 'Chat participant 1' to 'Chat participant 4', respectively, register in the messenger service are displayed as an ID in an actual group chat window of the conventional messenger service. The chat participant 1 of the chat participants 1 to 4 corresponds to a user of the mobile terminal in which the group chat window 100 is displayed, and the chat participants 2 to 4 correspond to group chat counterparts of the chat participant 1.

The chat logs 108, 110, 112, 114, 116, 118, and 120 correspond to the chat logs regarding the messages exchanged between the chat participants 1 to 4, respectively, and are arranged and displayed in an order in which the messages were sent, for example as shown an order of the messages is displayed from a top to a bottom in the chat log window 102. Whenever a new message is additionally sent, a chat log regarding the new message is additionally displayed at a lowermost end of the existing chat logs, and the existing chat logs are accordingly scrolled upward. Thus, the chat log 120 located at the lowermost end of the chat logs 108, 110, 112, 114, 116, 118, and 120 corresponds to a chat log regarding a recently sent message.

The chat logs 110 and 116 of the chat logs 108, 110, 112, 114, 116, 118, and 120 correspond to chat logs of the chat participant 1 using the mobile terminal which displays the group chat window 100, and the chat logs 108, 112, 114, 118, and 120 correspond to chat logs of the chat participants 2 to 4 who are the group chat counterparts of the chat participant 1.

As in the example shown in the group chat window 100 of FIG. 1, the chat logs 110, and 116 of the chat participant 1 are arranged on a right side of the chat log window 102, and the chat logs 108, 112, 114, 118, and 120 of the chat participants 2 to 4 are arranged on a left side of the chat log window 102, which enables the chat participant 1 to readily distinguish the chat logs of the chat participant 1 from the chat logs of the group chat counterparts. Each of the chat logs 108, 110, 112, 114, 116, 118, and 120 includes a message which one of the chat participants send, and identification information regarding the chat participant who sent the message. Representatively considering the chat log 110 of the chat logs 108, 110, 112, 114, 116, 118, and 120, an ID 122 which the chat participant 1 registers as 'Chat participant 1' in the messenger service, and a registration image 124 which the chat participant 1 registers in the messenger service are included as identification information in the chat log 110, and a message 126 which the chat participant 1 sends is also included in the chat log 110. Accordingly, the chat participant 1 may identify that the group chat between the chat participants 1 to 4 progresses, through the chat logs 108, 110, 112, 114, 116, 118, and 120.

Moreover, the group chat window 100 shows an example in which information 101 identifies that the four chat participants 1 to 4 are participating in the group chat is displayed at an upper end thereof. More particularly, the registered images of the chat participants 1 to 4, and 'Group chat (four)', a text for showing that the four chat participants 1 to 4 are participating in the group chat, are displayed at an upper side of the chat log window 102.

When the chat participant 1 desires to send the chat participants 2 to 4 a message, the chat participant 1 inputs the message which will be sent to the chat participants 2 to 4 in the message input window 104. When the chat participant 1 completes a message input, and clicks the send button 106, the message is sent to the chat participants 2 to 4. In general, as the user shortly touches the send button 106, a click operation for the send button 106 is performed.

When the chat participant 1 desires to send only an individual group chat participant a message, while participating in the group chat through the group chat window 100, the chat participant 1 attempts a one to one chat. In the following description, an example where the one to one chat is performed between the chat participants 1 and 4 will now be given. First, the chat participant 1 clicks the registered image, for example, included in one chat log of the chat logs 114 and 120 of the chat participant 4 to select the chat participant 4. Then, a private chat designation window is displayed instead of the group chat window 100.

FIG. 2 shows an example of a private chat designation window according to a conventional messenger service. FIG. 2 shows an example of a private chat designation window 200 displayed through the mobile terminal of the chat participant 1, when the chat participant 1 selects the chat participant 4 in order to perform the one to one chat with the chat participant 4, while the chat participant 1 is also participating in the group chat with the chat participants 2 to 4 through the group chat window 100 shown in FIG. 1.

Referring now to FIG. 2, the private chat designation window 200 includes a one to one chat button 202 marked as 'One to One Chat', and identification information 204 on the chat participant 4. The one to one chat button 202 is used for designating the chat participant 4 as a private chat participant for the one to one chat, and starting the one to one chat. When the chat participant 1 clicks/selects the one to one chat button 202, the chat participant 4 is designated as a participant for the one to one chat, and a private chat window instead of the private chat designation window 200 is displayed on the display of the mobile terminal. The identification information 204 includes an ID 206, a registered image 208, and registered information 210 of the chat participant 4. In general, in this example a phone number of the chat participant 4 is included as registered information 210.

FIG. 3 shows an example of a private chat window according to a conventional messenger service. FIG. 3 shows an example of a private chat window 300 displayed when the chat participant 1 clicks the one to one chat button 202 in the private chat designation window 200 shown in the FIG. 2 to designate the chat participant 4 as a participant for the one to one chat. Moreover, the private chat window 300 shows an example in which the chat participant 1 alternately exchanges four messages one by one with the chat participant 4 through the private chat window 300 after the chat participant 1 designates the chat participant 4 as a participant for the one to one chat.

Referring now to FIG. 3, the private chat window 300 includes a chat log window 302, a message input window 304, and a send button 306, in this example being shown as being similar to the group chat window 100 shown in FIG. 1. In the chat log window 302, chat logs 308, 310, 312, and 314 regarding the messages exchanged between the private chat participants 1 and 4, respectively, are arranged and displayed in an order in which the messages were sent, and the messages are displayed in the sent order from a top to a bottom of the display. Whenever a new message is additionally sent, a chat log regarding the new message is additionally displayed at a lowermost end of the existing chat logs, and the existing chat logs are accordingly scrolled upward. Thus, the chat log 314 located at the lowermost end of the chat logs 308, 310, 312, and 314 corresponds to a chat log regarding a recently sent message.

The chat logs 308 and 312 shown in FIG. 3 of the chat logs 308, 310, 312, and 314 correspond to chat logs of the chat participant 1 using the mobile terminal which displays the private chat window 300, and the chat logs 310 and 314 correspond to chat logs of the chat participant 4 who is a private chat counterpart of the chat participant 1. As the example shown in the private chat window 300, the chat logs 308 and 312 of the chat participant 1 are arranged on a right side of the chat log window 302, and the chat logs 310 and 314 of the chat participant 4 are arranged on a left side of the chat log window 302, which enables the chat participant 1 to readily distinguish the chat logs of the participant 1 from the chat logs of the chat participant 4 who is the private chat counterpart. Each of the chat logs 308, 310, 312, and 314 commonly includes message contents which the chat participants send, and identification information on the chat participants, is similar to the chat logs 108, 110, 112, 114, 116, 118, and 120 shown in FIG. 1. Accordingly, detailed descriptions of both the message contents included in the chat logs 308, 310, 312, and 314, and the identification information will be omitted to avoid redundancy. Moreover, the private chat window 300 shows an example in which information for showing that the chat participant 1 is participating in the private chat with the chat participant 4 is displayed at an upper end thereof. More particularly, the registered image of the chat participant 4 in this illustration is displayed at an upper side of the chat log window 302, and may or may not include an additional visual image or may display the term "Private Chat" or an image that at a glance identifies that the chat is private. The chat participant 1 sends the chat participant 4 the message, likewise the group chat described above with reference to FIG. 1, except for a difference where the message sending is performed between the chat participants 1 and 4. Accordingly, detailed description regarding this will be omitted.

When the chat participant 1 desires to participate in the group chat with the chat participants 2 to 4 again, while participating in the private chat through the private chat window 300, the chat participant 1 first exits the private chat window 300. Then, a chat list instead of the private chat window 300 is displayed on the display of the mobile terminal. In general, the chat list corresponds to a list regarding the chats in which the user using the mobile terminal participates. Accordingly, the chat list displayed at this time includes two chats in which the chat participant 1 participates, that is, the group chat between the chat participants 1 to 4, and the private chat the chat participants 1 and 4. In such the chat list, the chat participant 1 selects the group chat between the chat participants 1 to 4. Then, the group chat window 100 (e.g. as shown in FIG. 1) instead of the chat list is displayed on the display of the mobile terminal again.

As described above, in the conventional messenger service, the group chat window 100, and the private chat window 300 are provided as separate screens. Accordingly, when the user participates in both the group chat and the private chat at the same time, the user must separately identify the screen of the group chat window 100 and the screen of the private chat window 300, and must separately participate in both the group chat and the private chat. That is, the user must view or participate in the group chat and the private chat, while shuttling between the group chat window 100 and the private chat window 300. Moreover, the user must designate the private chat participant through the private chat designation window 200 provided as a separate screen during the group chat.

FIG. 4 shows an example of a group chat window for providing a private chat in a group chat according to an embodiment of the present invention. A group chat window 400 shown in FIG. 4 shows an embodiment in which the private chat is also progressing during the group chat, while the group chat is progressing according to the embodiment of the present invention, in the messenger service. The group chat window 400 is displayed on the display of the mobile terminal in which the messenger service is being executed.

The group chat window 400 shown in FIG. 4 illustrates an embodiment in which the group chat including four group chat participants participate is progressing, similar to the above-described the group chat window 100 shown in FIG. 1. Accordingly, in the following description, of contents related to the group chat, the contents similar to the above-described description regarding the group chat window 100 may not be described.

Referring now to FIG. 4, the group chat window 400 may include a chat log window 402, a message input window 404, and a send button 406. Chat logs 408, 410, 412, 414, 416, 418, and 420 are displayed in the chat log window 402. 'Participant 1' to 'Participant 4' are IDs of the four group chat participants participating in the group chat in the chat logs 408, 410, 412, 414, 416, 418, and 420. The chat participant 1 of the chat participants 1 to 4 corresponds to a user of the mobile terminal in which the group chat window 400 is displayed, and the chat participants 2 to 4 correspond to group chat counterparts of the chat participant 1.

Moreover, in order to assist with an artisan's understanding of the various embodiments of the present invention, the group chat window 400 shows an embodiment in which the chat logs 408, 410, 412, 414, 416, 418, and 420 are similar to the chat logs 108, 110, 112, 114, 116, 118, and 120, respectively.

Accordingly, FIG. 4 shows the embodiment in which the chat logs of the chat participant 1 are arranged on a right side of the chat log window 402, the chat logs of the chat participants 2 to 4 are arranged on a left side of the chat log window 402, and the chat logs 108, 110, 112, 114, 116, 118, and 120 are arranged and displayed in a send order of the messages from a top to a bottom.

Each of the chat logs 408, 410, 412, 414, 416, 418, and 420 commonly includes message contents which the chat participants send, and identification information on the chat participants, likewise the chat logs 108, 110, 112, 114, 116, 118, and 120. Representatively considering the chat log 410 of the chat logs 408, 410, 412, 414, 416, 418, and 420, an ID 422 which the chat participant 1 registers as 'Chat participant 1' in the messenger service, and a registration image 424 which the chat participant 1 registers in the messenger service are included as identification information in the chat log 410, and message contents 426 which the chat participant 1 sends is also included in the chat log 410.

Moreover, the group chat window 400 shows an embodiment in which information for showing that the four chat participants 1 to 4 are participating in the group chat is displayed at an upper end thereof. More particularly, the registered images of the chat participants 1 to 4, and 'Group chat (four)', a text for showing that the four chat participants 1 to 4 are participating in the group chat, are displayed at an upper side of the chat log window 402. However, it is within the breadth of the present invention that other arrangements may be provided than shown in FIG. 4. When the chat participant 1 desires to send the chat participants 2 to 4 a message, the chat participant 1 inputs the message which will be sent to the chat participants 2 to 4 in the message input window 404. When the chat participant 1 completes a message input, and clicks the send button 406 (or activates the send function through touch, near-touch, sliding, swiping, waving, voice, etc.) the message is sent to the chat participants 2 to 4. As the user shortly touches the send button 406, a click operation for the send button 406 may be performed.

When the chat participant 1 desires to send a message only to a specific group chat counterpart, for example, only the chat participant 4 of the chat participants 2 to 4, while participating in the group chat through the group chat window 400, the chat participant 1 selects the chat participant 4 as a private chat participant. In an embodiment of the present invention, a selection of the private chat participant may be performed, by selecting the at least one identification information included in any one of the chat logs of the chat participant desired to participate in the private chat, of the group chat counterparts. For example, when the identification information is clicked, the identification information may be selected. As another embodiment, when the identification information is lengthily touched, the identification information may be selected. In addition, a copy of the identification message can be dragged down to the message input window 404. The identification information may correspond to one of the ID and the displayed image of the chat participant included in the chat logs. Accordingly, the chat participant 1 selects the ID or the registered image included in any one of the chat logs 414 and 420 of the chat participant 4, thereby selecting the chat participant 4 as a private chat participant. As another embodiment, the chat participant 1 selects the message contents included in the chat log regarding the chat participant 4, thereby selecting the chat participant 4 as a private chat participant.

The identification information may correspond to other information as well as the ID or the registered image of the chat participant, if the identification information corresponds to information capable of identifying the chat participants. For example, a registered information such as a phone number of the chat participant may also be included in the chat log as identification information. In this case, the chat participant 1 clicks the registered information included in the chat log of the chat participant 4, thereby selecting the chat participant 4 as a private chat participant. In addition, an email address, or even an Internet Protocol (IP) address can also be used. A username or nickname that is registered can also be used, as the phone number, etc. associated with the nickname can be identified to select the participant for a chat session.

In response to the chat participant 1 selecting the chat participant 4 as a private chat participant, the chat participant 4 is designated as a private chat participant. When the chat participant 4 is designated as a private chat participant, the identification information regarding the chat participant 4 is displayed in the message input window 404. The identification information displayed in the message input window 404 may correspond to, for example, at least one of the ID, the registered image, and the registered information regarding the chat participant 4.

For example, FIG. 4 shows an embodiment in which a registered image 430 is included in the message input window 404 as identification information regarding the chat participant 4. In this way, in a state where the registered image 430 of the chat participant 4 is included in the message input window 404 to be displayed, when the chat participant 1 clicks the send button 406, a message 428 input in the message input window 404 is sent only to the chat participant 4.

Although FIG. 4 shows the embodiment in which the chat participant 4, one of the group chat counterparts, is selected and designated as a private chat participant, any number of the group chat counterparts may also be additionally designated as a private chat participant within a range smaller than the number of all group chat participants in the same way as the above-described private chat participant designation. Moreover, the private chat participant designation is possible at any time during the group chat. For example, before, while, or after the message 428 is input in the message input window 404, the private chat participant designation is possible.

As described above, the user may identify the currently designated private chat participant together with a progress of the private chat through the message input window 404 of the group chat window 400. Moreover, the message input window 404 is commonly used for inputting a message which will be sent to the private chat participant as well as a message which will be sent to the group chat counterparts. Furthermore, in the event that the group chat and the private chat do not progress together, that is, when the identification information of the private chat participant is not displayed in the message input window 404, the message is sent to all group chat counterparts, likewise the conventional group chat. On the other hand, when the group chat and the private chat progress together, that is, when the identification information of the at least one private chat participant is included and displayed in the message input window 404, the message is sent only to the private chat participant. Accordingly, the user may simply and conveniently perform the private chat as well as the group chat through only the screen of the group chat window 400 without separate use of the private chat window. Moreover, the user may simply and conveniently designate the private chat participant through the group chat window 400 during the group chat without needing to use the separate private chat designation window. It is also within the breadth of the invention that the counterpart chat participant 4 selected for private chat could receive and either decline or accept an invention to the private chat based on the selection of the chat participant 1. The counterpart chat participant can also have a changeable default for accepting or declining such one to one chat selection by the group chat participant 1. Automatic acceptance could also be individually designated either by the messenger service or via the electronic device of the individual chat participants.

Meanwhile, at any time the designation for the private chat participant may be released. The release of the private chat participant may be performed by selecting the identification information of the private chat participant included in the message input window 404. For example, in the case where the registered image 430 of the chat participant 4 included in the message input window 404 is clicked or lengthily touched by the user, the private chat participant designation of the chat participant 4 may be released. In another embodiment, once the message is sent to the private chat participant, the private chat participant designation for the chat participant may be automatically released. Also, a user may user touch or near touch of the message input window 404 and drag the information data and onto the group display, in which case the one to one chat may disappear from the screen, or can be stored.

It is within the breadth of the invention that different layouts and designated area of the screen can be apportioned in different ways than shown in FIG. 4.

Figure 5:
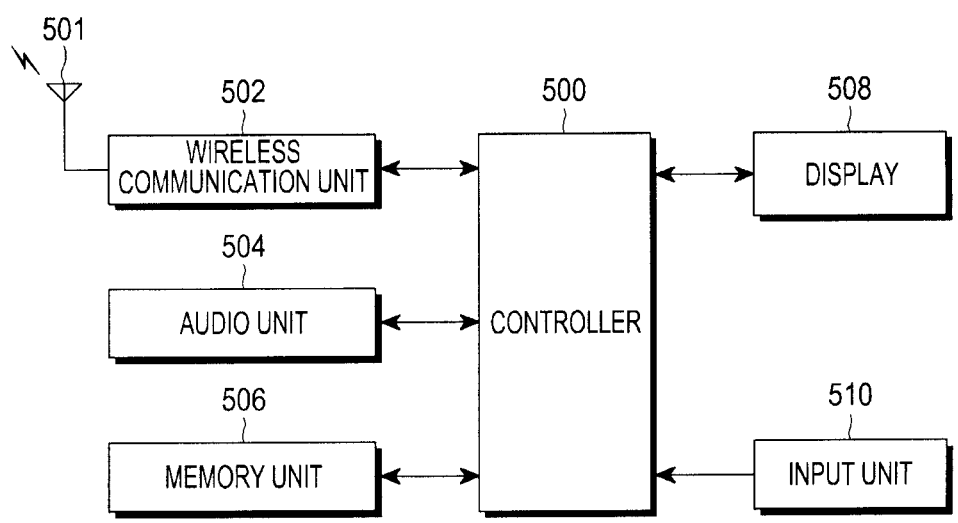
FIG. 5 is a block diagram showing a mobile terminal according to an embodiment of the present invention.

FIG. 5 is a block diagram showing one way the structure of a mobile terminal according to an embodiment of the present invention can be provided. FIG. 5 shows an embodiment of a mobile terminal which provides the group chat and the private chat through the group chat window, according to an embodiment of the present invention.

Referring now to FIG. 5, the mobile terminal may include a controller 500, a wireless communication unit 502, an audio unit 504, a memory unit 506, a display 508, and an input unit 510. The wireless communication unit 502 includes a transceiver or transmitter and receiver to transmit and receive a wireless signal for a mobile communication function of the mobile terminal to and from a mobile communication network via antenna 501. The audio unit 504 includes an audio output device such as a speaker, and an audio input device such as a microphone, and inputs and outputs various audio signals according to an operation of the mobile terminal. The audio unit may further include circuitry such as an audio processor or microprocessor. The memory unit 506, which comprises a non-transitory machine readable medium, stores a program comprising machine executable code that is loaded into the controller to configure operation of the controller 500, and can include various data associated with an operation of the controller 500. An external memory may be further included in the memory unit 506, and a storage device such as Hard Disk Drive (HDD) may also be further included in the memory unit 506. The display 508 provides an input interface in response to a user contact or near-contact (e.g. touch or near-touch that is detectable within a certain detection distance from the touch screen display) and an image output interface between the mobile terminal and the user. The display 508 displays an image according to an operation of the controller 500 on the screen, and when a display screen of the display 508 is a touch screen, also provides an input in response to the user contact on the screen to the controller 500. The user contact may correspond to a contact input such as a stylus pen, or a contact of a human body. The contact includes proximity to the screen (near-contact) as well as a direct contact on the screen. The input unit 510 may be one of various types of input units that can include gestures, touch, real or virtual keys, pointer, etc., just to name a few of the many possibilities. In the case in which the input unit 510 includes real or virtual keys, the input unit can include various function keys such as a power button, and a volume adjusting button. The key input unit 510 may further include a keypad or a keyboard for inputting numeral or character information. The controller 500, which includes a processor or microprocessor, is configured to control the wireless communication unit 502, the audio unit 504, the memory unit 506, and in the case where the display 508 is a touch screen display, in response to a user input through the touch screen of the display 508 and/or the input unit 510 to perform a general function of the mobile terminal. Moreover, the controller 500 also operates to provide a private chat in a group chat according to an embodiment of the present invention, while executing a messenger service.

The display 508 displays a group chat window commonly used in the group chat and the private chat under the control of the controller 500, and in the case of a touch-sensitive display (touch screen) receives the user input through the group chat window to the controller 500. The group chat window includes a chat log window and a message input window, and the message input window is commonly used for inputting a message for the private chat as well as a message for the group chat. The group chat window may correspond to, for example, the above-described group chat window 400 shown in FIG. 4, or may correspond to one of group chat windows according to other various embodiments of the present invention as discussed herein below.

The controller 500 provides the private chat in the group chat through the group chat window commonly used in the group chat and the private chat as the embodiment described above with reference to FIG. 4. Accordingly, the controller 500 designates at least one group chat participant selected from group chat counterparts as a private chat participant. The controller 500 displays identification information regarding the chat participant designated as a private chat participant in the message input window of the group chat window. The controller 500 controls the wireless communication unit 502 to send the message input in the message input window to all group chat counterparts or only the private chat participant according to the private chat participant designation. The controller 500 may release the private chat participant designation, as described in the explanation of the group chat window according to the above-described embodiment shown in FIG. 4, and other various embodiments of the present invention which will be described as below.

Figure 6:
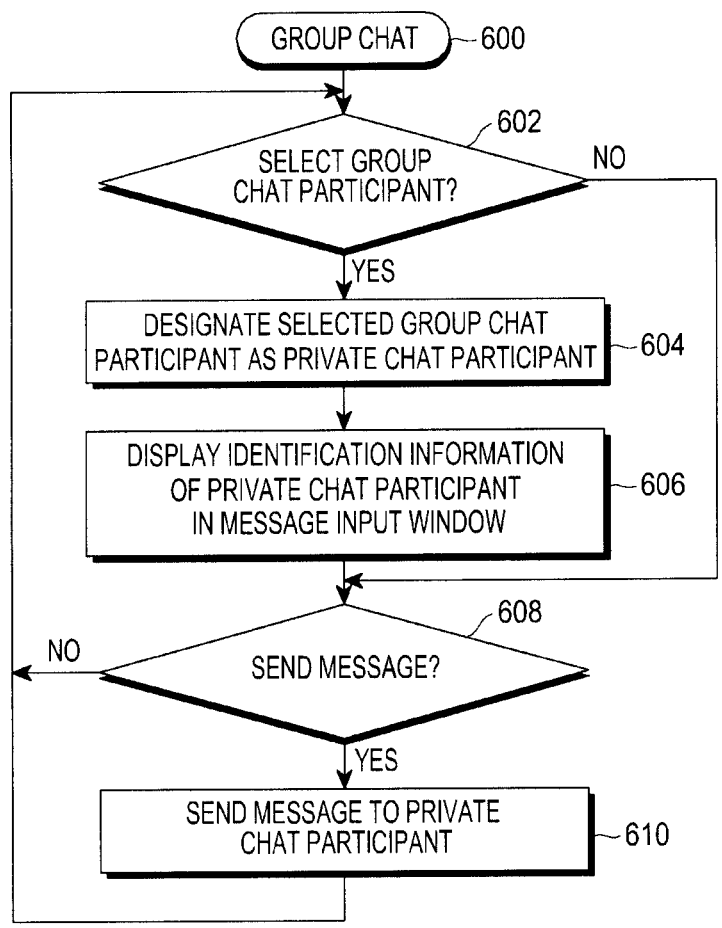
FIG. 6 is a flowchart showing operation of a process of providing a private chat according to an embodiment of the present invention.

FIG. 6 is a flowchart showing operation of a process of providing a private chat according to an embodiment of the present invention. FIG. 6 shows the flowchart illustrating operation of a process which the mobile terminal shown in FIG. 5 performs according to the embodiment of the present invention which is described above with reference to FIG. 4.

Referring now to FIG. 6, the controller 500 determines a selection for the group chat participant of the group chat counterparts from the user input through the touch screen of the display 508 in operation 602, while the group chat is progressing in operation 600. When the group chat participant is not selected, the controller 500 executes a, operation 608. When the chat participant 4 is selected as described above with reference to FIG. 4, the controller 500 designates the selected chat participant 4 as a private chat participant in operation 604, and displays the identification information of the private chat participant in the message input window 404, as the embodiment shown in the group chat window 400 of FIG. 4, in operation 606.

Thereafter, the controller 500 determines whether or not the message is sent, in operation 608. For example, the controller 500 determines whether or not the user manipulates the send button 406 to instruct sending of the message. When there is no instruction for sending the message, the controller returns to the operation 602. On the other hand, when the message sending is instructed, the controller 500 sends the message input in the message input window 404 to the chat participant 4, at operation 610. Accordingly, the message is not sent to the chat participants 2 and 3 of the group chat counterparts, and is sent only to the chat participant 4. The controller 500 then re-performs operation 602, after operation 610.

When the chat participant 4 is selected as described above, the chat participant 4 is designated as a private chat participant, and while the chat participant 4 is designated as a private chat participant, the message is sent only to the chat participant 4. Although not shown, and omitted in FIG. 6, as disclosed in the explanation described above with reference to FIG. 4, in response to the private chat participant designation for the chat participant 4 is released, thereafter, the message is commonly sent to the chat participants 2 to 4 who are all group chat counterparts.

Meanwhile, as the private chat is provided during the group chat through the group chat window 400 as described above, the chat logs are preferably displayed such that the user may distinguish the group chat log from the private chat log through the group chat window 400. The group chat log indicates the chat log according to the group chat, and the private chat log indicates the chat log according to the private chat.

Figure 7:
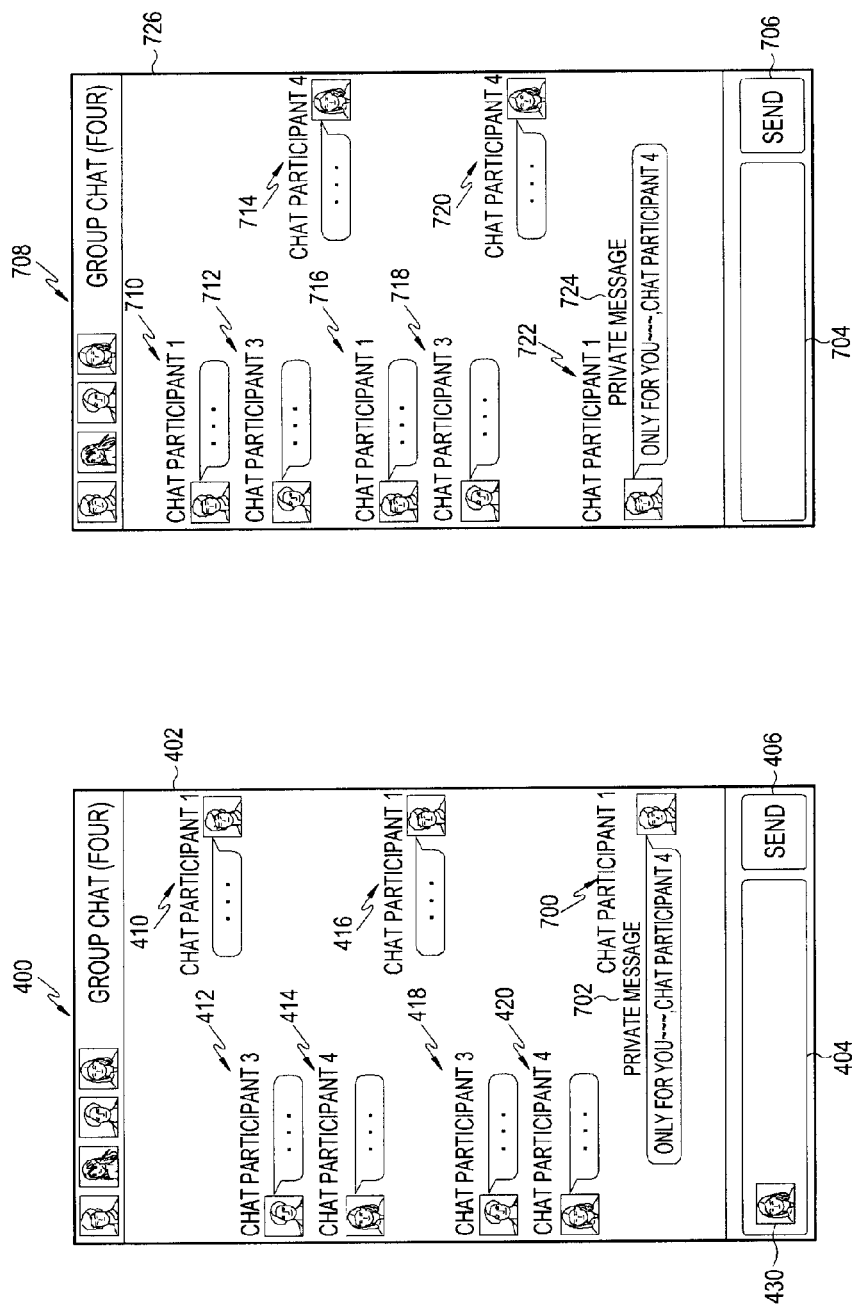
FIG. 7A and FIG. 7B show examples of a chat log display according to an embodiment of the present invention.

FIGS. 7A and 7B show examples of a chat log display according to an embodiment of the present invention. FIGS. 7A and 7B show embodiments in which the chat participant 1 designates the chat participant 4 as a private chat participant to send a message, as described above. FIG. 7A shows embodiments of chat logs included in the group chat window 400 displayed through the mobile terminal of the chat participant 1, and FIG. 7B shows embodiments of chat logs included in a group chat window 708 displayed through a mobile terminal of the chat participant 4.

Referring again to FIG. 7A, while the chat logs 408, 410, 412, 414, 416, 418, and 420 are being displayed in the group chat window 400 as shown in FIG. 4, as the chat participant 1 sends the chat participant 4 the private message, a private chat log 700 is added to the chat log window 402. The private message refers to the message exchanged between the private chat participants. In FIG. 7A, it can be seen that, as the private chat log 700 is added anew, the chat logs 408, 410, 412, 414, 416, 418, and 420 in the chat log window 402 are scrolled upward so that the chat log 408 displayed at the top disappears. In the present specification, in a case in which it is necessary to distinguish the chat logs 408, 410, 412, 414, 416, 418, and 420 from the private chat log 700, the chat logs 408, 410, 412, 414, 416, 418, and 420 are referred to as 'Group chat log", as well.

However, other distinctive designations are within the breadth of the invention. Also, visual distinctiveness (size, color, font, brightness, blinking, etc.) of virtually any type can be used to distinguish the group chat logs from the private chat log(s).

The private chat log 700 includes a private chat indicator 702 for indicating that the private chat log 700 corresponds to the private chat. FIG. 7A shows an embodiment in which the private chat indicator 702 is displayed with a title of 'Private message'. Of course, the private chat indicator 702 may be displayed with any title with different contents in addition to that, and may be displayed with a specific form of indicator instead of the title.

Referring to FIG. 7B, the group chat window 708 of the chat participant 4 also includes a chat log window 726, a message input window 704, and a send button 706 (a real or virtual button or other way to activate the send function) which correspond to the chat log window 402, the message input window 404, and the send button 406 of the group chat window 400 of the chat participant 1, respectively. In the chat log window 726, the chat logs 710, 712, 714, 716, 718, and 720 corresponding to the chat logs 410, 412, 414, 416, 418, and 420 of the group chat window 400 of the chat participant 1, respectively, are displayed, and a private chat log 722 corresponding to the private chat log 700 of the group chat window 400 of the chat participant 1 is also displayed. Moreover, since the group chat window 708 corresponds to the group chat window of the chat participant 4, FIG. 7B shows an embodiment in which the chat logs 714 and 720 in response to a message sending of the chat participant 4 are arranged on a right side of the chat log window 726, and the chat logs 710, 712, 716, 718, and 722 in response to a message sending of the other group chat participants are arranged on a left side of the chat log window 726.

As shown in FIG. 7B, the private chat log 722 includes the private chat indicator 724 in the chat log window 726 of the chat participant 4 as well. Accordingly, the chat participant 4 can see the private chat indicator 724, thereby knowing that the message which the chat participant 1 sends corresponds to the private message. The chat participant 4 may send the private message to the chat participant 1 in response to the message of the private chat log 722 regarding the chat participant 1. In this case, the chat participant 4 has only to designate the chat participant 1 as a private chat participant to send the message, according to the above-described method in which the chat participant 1 designates the chat participant 4 as a private chat participant to send the private message. In another embodiment, when the chat participant 4 receives the private message from the chat participant 1, the chat participant 1 may also be automatically designated as a private chat participant.

Thus, the user may distinguish the group chat log from the private chat log according to the private chat indicator regarding the chat logs. Accordingly, even when the user performs the private chat together with the group chat through the group chat window 400, the user may identify the progress of the group chat and the private chat at a glance, and may readily distinguish the private chat log from the group chat log.

Figure 8:
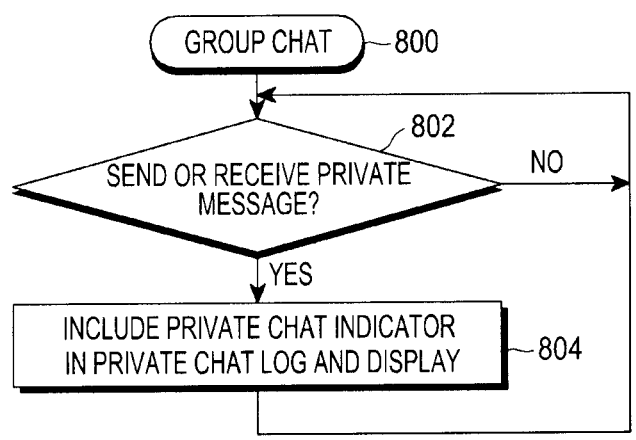
FIG. 8 is a flowchart showing operation of a process of displaying the chat log according to an embodiment of the present invention.

FIG. 8 is a flowchart showing operation of a process of displaying the chat log according to an embodiment of the present invention. FIG. 8 shows the flowchart illustrating a process which the mobile terminal shown in FIG. 5 performs according to the embodiment of the present invention which is described above with reference to FIGS. 7A and 7B.

Referring to FIG. 8, while the group chat is progressing in operation 800, the controller 500 determines sending or receiving of the private message, in operation 802. When the private message is sent or received, the controller 500 includes the private chat indicator in the private chat log to display the private chat log, as shown in FIGS. 7A and 7B, in operation 804.

Figure 9:
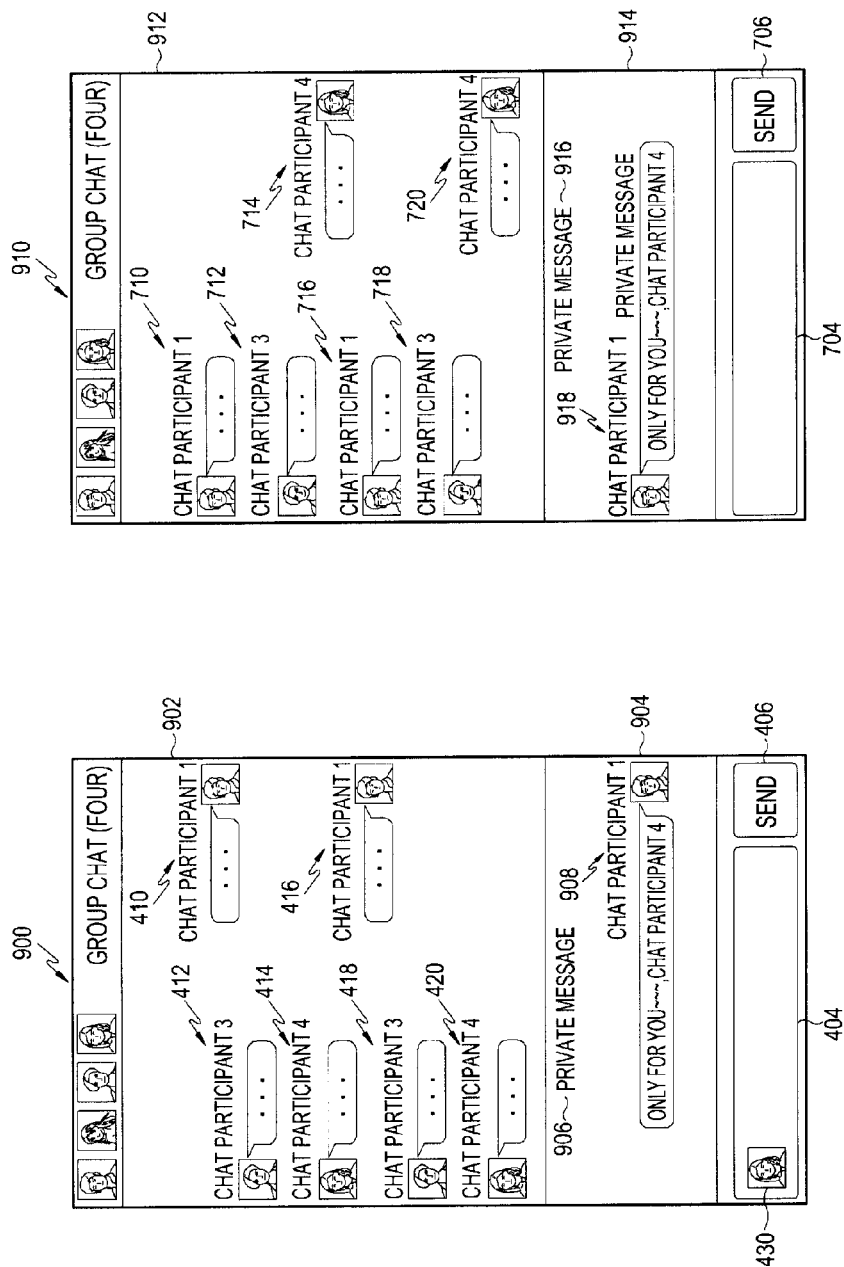
FIG. 9A and FIG. 9B show examples of a chat log display according to another embodiment of the present invention.

FIGS. 9A and 9B show examples of a chat log display according to another embodiment of the present invention. FIGS. 9A and 9B show embodiments in which, when the chat participant 1 designates the chat participant 4 as a private chat participant to send a message, as described above, the private chat log is displayed differently from the FIGS. 7A and 7B. FIG. 9A shows embodiments of chat logs included in the group chat window 900 corresponding to the group chat window 400 displayed through the mobile terminal of the chat participant 1. FIG. 9B shows embodiments of chat logs included in a group chat window 910 corresponding to the group chat window 708 displayed through the mobile terminal of the chat participant 4.

Referring to FIG. 9A, the group chat window 900 includes a group chat log window 902, and a private chat log window 904. The group chat logs 410, 412, 414, 416, 418, and 420 are included in the group chat log window 902, and a private chat log 908 is included in the private chat log window 904. Moreover, a private chat indicator 906 like the embodiment marked as 'Private message' is included in the private chat log window 904. In this way, the group chat logs 410, 412, 414, 416, 418, and 420, and the private chat log 908 may be displayed in the separate chat log windows, and the private chat display 906 is included in the private chat log window 904, which enables the user to identify the progress of the group chat and the private chat at a glance, and to readily distinguish the private chat log from the group chat log.

Referring to FIG. 9B, the group chat window 910 includes a group chat log window 912, and a private chat log window 914. The group chat logs 710, 712, 714, 716, 718, and 720 are included in the group chat log window 912, and a private chat log is included in the private chat log window 914. Moreover, a private chat indicator 916 such as in the embodiment marked as 'Private message' may be included in the private chat log window 914. In this way, the group chat logs 710, 712, 714, 716, 718, and 720, and the private chat log 918 are displayed in the separate chat log windows, and the private chat indicator 916 is included in the private chat log window 914, which enables the user to identify the progress of the group chat and the private chat at a glance, and to readily distinguish the private chat log from the group chat log.

According to another embodiment of the present invention, a indicator for indicating the group chat may be provided in the group chat log windows 902 and 912 in a method similar to the method in which the private chat displays 906 and 916 are included in the private chat log windows 904 and 914, respectively. Moreover, when the indicator for indicating the group chat are included in the group chat log windows 902 and 912, the private chat indicators 906 and 916 may be omitted.

Figure 10:
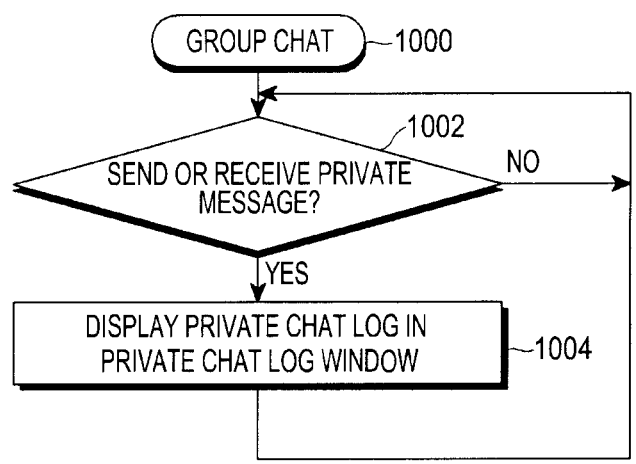
FIG. 10 is a flowchart showing a process of displaying the chat log according to another embodiment of the present invention.

FIG. 10 is a flowchart showing operation a process of displaying the chat log according to another embodiment of the present invention. FIG. 10 shows the flowchart illustrating a process which the mobile terminal shown in FIG. 5 performs according to the embodiment of the present invention which is described above with reference to FIGS. 9A and 9B.

Referring to FIG. 10, while the group chat is progressing in operation 1000, the controller 500 determines sending or receiving of the private message, in operation 1002. When the private message is sent or received, the controller 500 displays the private chat log in the private chat log window included in the group chat window, as shown in the group chat window 900 of FIG. 9A or in the group chat window 910 of FIG. 9B, in operation 1004. In a case of sending the private message, the controller 500 displays the private chat log in response to sending of the private message, as shown in the private chat log window 904 of the group chat window 900 of FIG. 9A. In a case of receiving the private message, the controller 500 displays the private chat log in response to receiving of the private message, as shown in the private chat log window 914 of the group chat window 910 of FIG. 9B.

Figure 11:
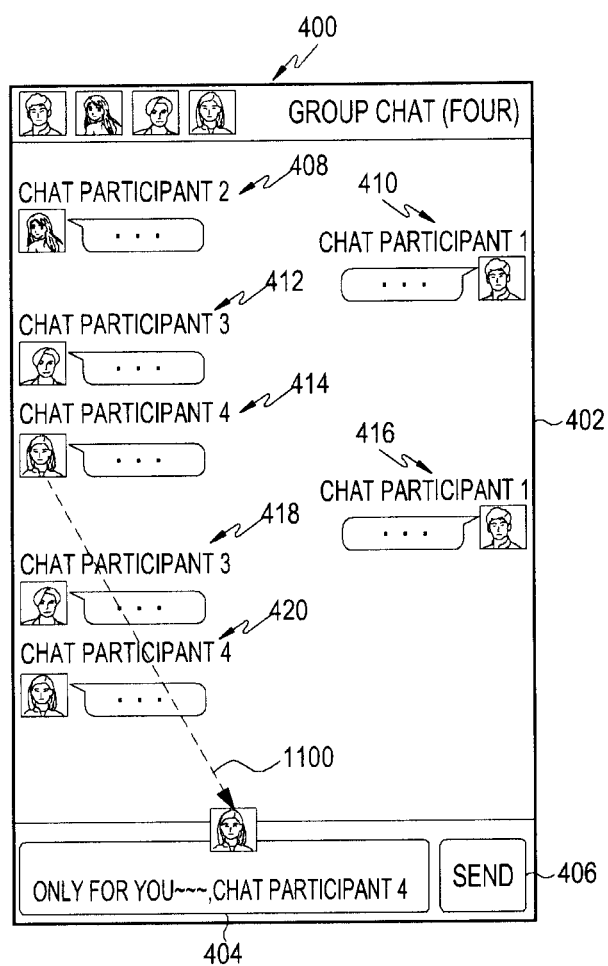
FIG. 11 shows an example of a process for designating a private chat participant according to another embodiment of the present invention.

FIG. 11 shows an example of a process for designating a private chat participant according to another embodiment of the present invention. FIG. 11 shows an embodiment in which the private chat participant is designated in a method different from the private chat participant designating method described above with reference to FIG. 4.

Referring to FIG. 11, when the chat participant 1 desires that chat participant 4 is to be designated as a private chat participant, the chat participant 1 performs a drag motion 1100 from the registered image of the chat participant 4 included in the chat log 414 regarding the chat participant 4 to the message input window 404 in the chat log window 402 of the group chat window 400. Then, the chat participant 4 is designated as a private chat participant, and the registered image of the chat participant 4 is displayed as identification information regarding the chat participant 4 in the message input window 404.

Meanwhile, the chat participant 4 may designate as a private chat participant through a drag motion from other identification information such as an ID instead of the registered image, of the identification information included in the chat log 414, to the message input window 404. Moreover, the chat participant 4 may also be designated as a private chat participant through a drag motion from the message included in the chat log 414 to the message input window 404. In conclusion, the chat participant 4 may be designated as a private chat participant through the drag motion from the chat log 414 to the message input window 404. A drag target for the private chat participant designation for the chat participant 4 corresponds to other chat logs such as the chat log 420 as well as the chat log 414.

Although the private chat participants are designated one by one for one drag motion during designating the private chat participant through the drag motion shown in FIG. 11, a plurality of private chat participants may be designated through one drag motion by, for example, a multi-touch.

Figures 12A, 12B:
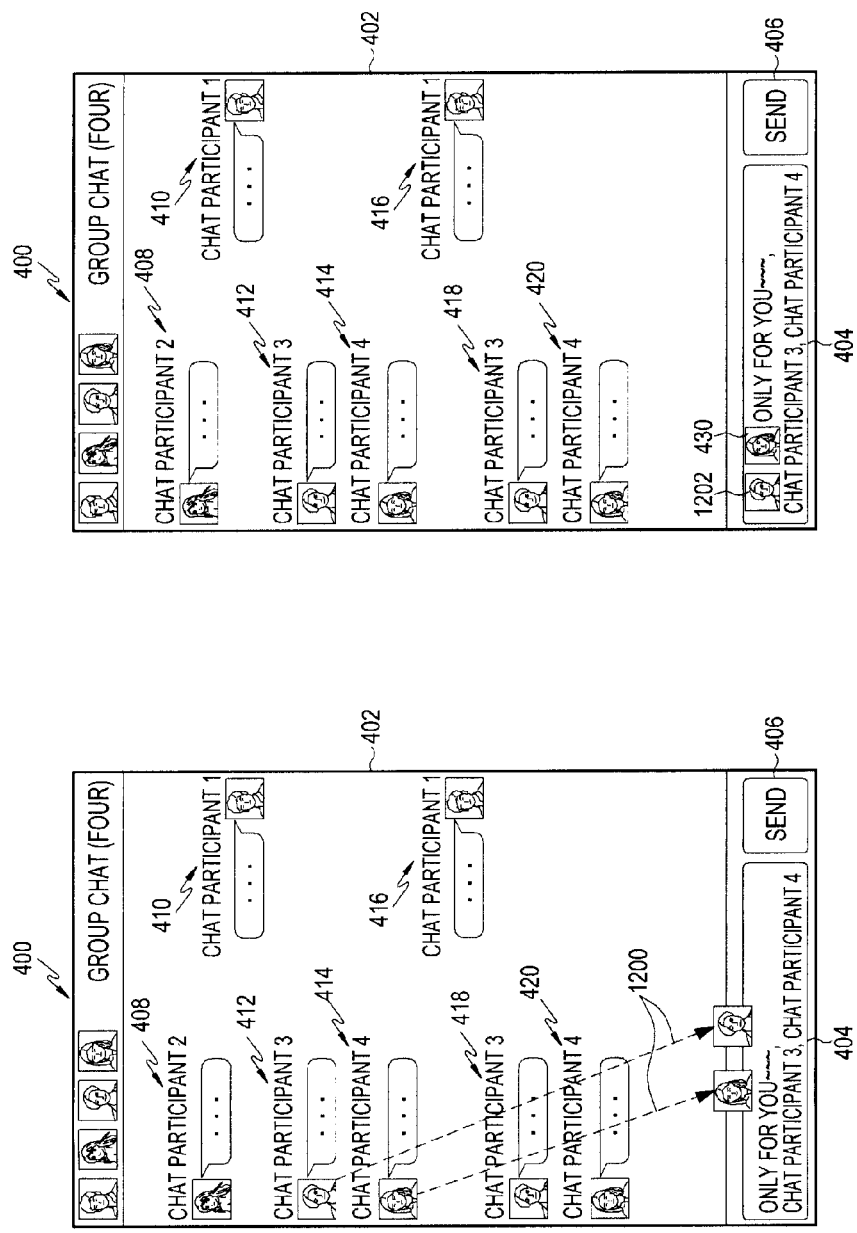
FIG. 12A and FIG. 12B show an example of a process for designating a private chat participant according to another embodiment of the present invention.

FIGS. 12A and 12B show an example of a process for designating a private chat participant according to another embodiment of the present invention. FIG. 12 A shows an embodiment of a drag motion for designating a plurality of private chat participants at the same time, and FIG. 12B shows an embodiment in which the plurality of private chat participants are designated at the same time according to the drag motion shown in FIG. 12A.

Referring to FIG. 12A, when the chat participant 1 desires a plurality of chat participants, for example, the chat participants 3 and 4 of the group chat counterparts to be designated as a private chat participant, the chat participant 1 multi-touches the registered image of the chat participant 3 included in the chat log 412 regarding the chat participant 3 (e.g. a tap or multiple taps), and the registered image of the chat participant 4 included in the chat log 414 regarding the chat participant 4, and simultaneously performs the drag motion 1200 on the multi-touched images into the message input window 404, in the chat log window 402 of the group chat window 400. The chat participant 1 may perform the drag motion 1200 by the multi-touch using two fingers. Then, the chat participants 3 and 4 are simultaneously designated as private chat participants, and the respective registered images 1202 and 430 of the chat participants 3 and 4 are displayed together in the message input window 404, as shown in FIG. 12B. Alternatively, the user can use two fingers and tap the images of 3 and 4 at the same time, or within a certain period of time, and may. For example, tap each image more than once, which can also have the same or similar result regarding designating private chat participants.

As shown in FIG. 12A, the chat participants 3 and 4 may be designated as private chat participants by the drag motion from other identification information such as ID instead of the registered image of the identification information included in the chat logs 412 and 414 to the message input window 404. Moreover, the chat participants 3 and 4 may also be designated as private chat participants by the drag motion from the message included in the chat logs 412 and 414 to the message input window 404. In conclusion, the chat participants 3 and 4 may be designated together as private chat participants by the drag motion from the chat logs 412 and 414 to the message input window 404. A drag target for the private chat participant designation for the chat participants 3 and 4 corresponds to other chat logs regarding the chat participants 3 and 4 such as the chat logs 418 and 420 as well as the chat logs 412 and 414.

Figure 13:
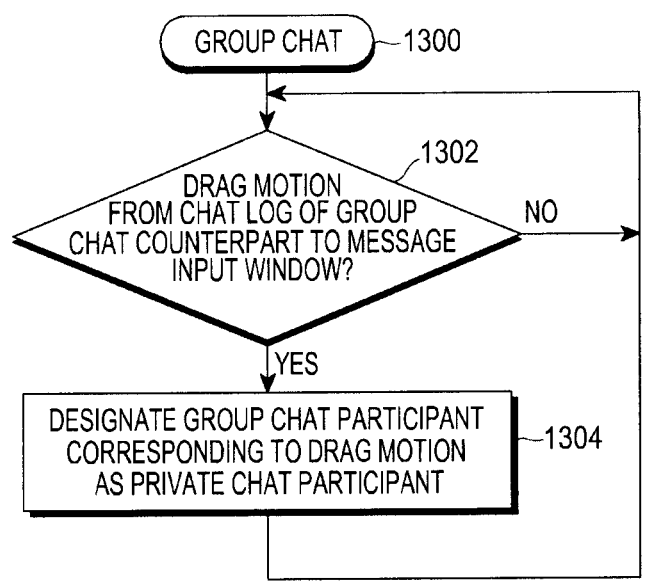
FIG. 13 is a flowchart showing operation of a process of designating the private chat participant according to another embodiment of the present invention.

FIG. 13 is a flowchart showing operation of a process of designating the private chat participant according to another embodiment of the present invention. FIG. 13 shows the flowchart illustrating a process which the mobile terminal shown in FIG. 5 performs according to the embodiment of the present invention which is described above with reference to FIGS. 11, 12A, and 12B.

Referring to FIG. 13, while the group chat is progressing in operation 1300, the controller 500 determines whether or not there is detected dragging motion (or tapping motion) from one chat log or a plurality of chat logs of the chat logs 408, 412, 414, 418, and 420 of the group chat counterparts included in the chat log window 402 of the group chat window 400 to the message input window 404 is performed in step 1302. For example, the dragging motion indicates the motion of performing the drag such as the drag 1100 of the chat participant 1 shown in FIG. 11 or the drag 1200 of the chat participant 1 shown in FIG. 12A.

When the dragging motion by the user is detected in operation 1302, the controller 500 designates the group chat participant corresponding to the drag motion as a private chat participant in operation 1304. At this time, if the drag motion corresponds to the drag 1200 for the chat participants 3 and 4 as shown in FIG. 12A, the controller 500 designates the chat participants 3 and 4 as private chat participants, and displays the registered images 1202 and 430, one of the identification information of the chat participants 3 and 4, in the message input window 404 as shown in FIG. 12B Accordingly, the user may simply and intuitively designate the private chat participant by the drag motion in the group chat window 400.

Meanwhile, the private chat participant designation may be released by the drag motion. That is, although the private chat participant designation may be released by the selection of the identification information of the private chat participant included in the message input window 404 as described above with reference to FIG. 4, the private chat participant designation may be released by the drag motion. For example, when at least one of the registered images 1202 and 430 of the chat participants 3 and 4 included in the message input window 404 is dragged toward the outside of the message input window 404, the private chat participant designation of the chat participant corresponding to the registered image which is dragged may be released. Again, an artisan should understand and appreciate that instead of dragging one or more taps can provide a same result as the dragging motion.

Meanwhile, although the specific embodiments have been described in the above description of the present invention, various modifications can be made without departing from the scope of the present invention. For example, in the present invention, the embodiments in which the private chat participant is designated or released by the click, the lengthy touch, or the drag for the touch screen of the display 508 of the mobile terminal have been described. However, the embodiments of the present invention may be applied to a various types of electronic devices capable of detecting various motions, a gesture, and eye movements of a user in a noncontact way of using a camera and an infrared sensor, as a user input. In this case, the private chat participant may be designated or released in response to a noncontact inputs of the user which correspond to the click, the lengthy touch, or the drag for the touch screen of the display 508.

Moreover, in the group chat according to the embodiments of the present invention, when the method for providing the private chat is applied to the mobile terminal, the mobile terminal can downloads a program (for example, an application) for providing the private chat in the group chat from a program providing device (for example, a server) which is situated at a remote location, and installs and executes the program to be used for providing the private chat in the group chat. Moreover, when the program for providing the private chat in the group chat is installed in the mobile terminal, the program may be executed in the mobile terminal to provide the private chat. The program providing device transmits the program to the mobile terminal in response to a transmission request for the program from the mobile terminal or automatically. At this time, the program providing device may additionally perform service subscription determination, user authentication, and payment information verification for the mobile terminal. The program providing device may include a communication unit for performing wired or wireless communication with the mobile terminal, a storage for storing the program, and a controller for transmitting the program to the mobile terminal through the communication unit. The storage may be located in an interior of the program providing device or at the outside of the program providing device.

The embodiments of the present invention can be realized in a form of hardware, software that is executed by hardware, or a combination of the hardware and software. The software can be stored in, for example, irrespective of being erasable or rewritable, a volatile or a non-volatile storage device such as a Read Only Memory (ROM) and, Random Access Memory (RAM), or an optically or magnetically recordable and machine readable storage medium such as a Compact Disk (CD), a Digital Versatile Disc (DVD), a magnetic disk, and a magnetic tape. Accordingly, the present invention includes a program which includes a code for realizing an apparatus and a method described in arbitrary claims of the present specification, and a storage medium which stores such a program as described above, and is machine (computer) readable. Moreover, such a program as described above can be electronically transferred through an arbitrary medium such as a communication signal transferred through cable or wireless connection and then stored on a non-transitory machine readable medium and/or loaded into a processor or controller, and other ways for obtaining an application as known in the art.

The above-described methods according to the present invention can be implemented in hardware, firmware or as software or computer code that is stored on a non-transitory machine readable medium such as a Compact Disk Read Only Memory (CD ROM), a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an Application Specific Integrated Circuit (ASIC) or Field Programmable Gate Array (FPGA). As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101 and none of the elements constitute of software per se.

The terms "unit" or "module" as may be used herein is to be understood as constituting or operating in conjunction with hardware such as a circuit, processor or microprocessor configured for a certain desired functionality in accordance with statutory subject matter under 35 U.S.C. § 101 and such terms do not constitute software per se.

Accordingly, the present invention is not to be limited or determined by the described embodiments.

What is claimed is:

1. An apparatus for providing a private chat in a group chat, comprising:
   a display configured to display a group chat window including a chat log window and a message input window, and display in the chat log window chat messages, each chat message is displayed in association with identification information regarding each participant of the group chat or the private chat who sent the chat message;
   a communication unit; and
   a controller configured to:
      designate at least one group chat participant as a private chat participant,
      display identification information regarding the private chat participant in the message input window,
      display the group chat and the private chat together in the chat log window,
      control the communication unit to transmit a first message inputted in the message input window to only the private chat participant, and
      in response to detection of a selection input of the identification information regarding the private chat participant in the message input window, control the communication unit to transmit a second message inputted in the message input window to all participants of the group chat.

2. The apparatus of claim 1, wherein the identification information regarding the private chat participant comprises at least one of identification (ID), a registered image, and registered information of the private chat participant.

3. The apparatus of claim 1, wherein the first message is transmitted to only the private chat participant when the identification information of the private chat participant is displayed in the message input window.

4. The apparatus of claim 1, wherein the controller controls display of a group chat log and a private chat log in the chat log window that are displayed together on that chat log window of the display, and the private chat log comprises a private chat indicator which indicates that the private chat log is the private chat.

5. The apparatus of claim 1, wherein the controller controls display of the group chat window in which a private chat log window displaying a private chat log is included.

6. The apparatus of claim 1, wherein the controller detects a gesture corresponding to a chat message of the at least one group chat participant displayed in the chat log window, wherein the detected gesture is defined to designate the at least one group chat participant as the private chat participant, and controls to display the identification information associated with the designated at least one group chat participant in the message input window as the private chat participant.

7. The apparatus of claim 6, wherein the detected gesture comprises multiple taps of the at least one group chat participant displayed in the chat log window.

8. An apparatus for providing a private chat in a group chat, comprising:
   a display configured to display a group chat window including a chat log window and a message input window, and display in the chat log window chat messages, each chat message is displayed in association with identification information regarding each participant of the group chat or the private chat who sent the chat message;
   a communication unit; and
   a controller configured to:
      detect a drag motion corresponding to a chat message of at least one group chat participant displayed in the chat log window to the message input window,
      designate the at least one group chat participant corresponding to the drag motion as a private chat participant, wherein the drag motion causes the identification information regarding the designated private chat participant to be also displayed in the message input window,
      display the group chat and the private chat together in the chat log window,
      control the communication unit to transmit a first message inputted in the message input window to only the private chat participant, and
      in response to detection of a selection input of the identification information regarding the private chat participant in the message input window, control the communication unit to transmit a second message inputted in the message input window to all participants of the group chat.

9. The apparatus of claim 8, wherein the identification information comprises at least one of identification (ID), a registered image, and registered information of the private chat participant.

10. The apparatus of claim 8, wherein the first message is transmitted to only the private chat participant when the identification information of the private chat participant is displayed in the message input window.

11. The apparatus of claim 8, wherein the controller controls display of a group chat log and a private chat log in the chat log window, and the private chat log includes a private chat indicator indicating that the private chat log is the private chat.

12. The apparatus of claim 8, wherein the controller controls display of the group chat window in which a private chat log window displaying a private chat log is included.

13. A method for providing a private chat in a group chat, comprising:
   displaying a group chat window including a chat log window and a message input window on a display screen, wherein the chat log window further displays chat messages, each chat message is displayed in association with identification information regarding each participant of the group chat or the private chat who sent the chat message;
   designating by a controller at least one group chat participant as a private chat participant;
   displaying identification information regarding the private chat participant in the message input window;
   displaying the group chat and the private chat together in the chat log window;
   transmitting a first message inputted in the message input window to only the private chat participant; and in response to detecting a selection input of the identification information regarding the private chat participant in the message input window, transmitting a second message inputted in the message input window to all participants of the group chat.

14. The method of claim 13, wherein the identification information comprises at least one of identification (ID), a registered image, and registered information of the private chat participant.

15. The method of claim 13, wherein the first message is transmitted to only the private chat participant when
the identification information of the private chat participant is displayed in the message input window.

16. The method of claim 13, further comprising:
displaying a group chat log and a private chat log in the chat log window, wherein the private chat log includes a private chat indicator which indicates that the private chat log is the private chat.

17. The method of claim 13, further comprising:
displaying the group chat window in which a private chat log window displaying a private chat log is included.

18. A method for providing a private chat in a group chat, comprising:
displaying a group chat window including a chat log window and a message input window on a touch screen, wherein the chat log window displays chat messages, each chat message is displayed in association with identification information regarding each participant of the group chat or the private chat who sent the chat message;
detecting a gesture corresponding to a chat message of at least one group chat participant displayed in the chat log window;
designating the at least one group chat participant corresponding to the gesture as a private chat participant, wherein the gesture is a movement from the chat message of the at least one group chat counterpart displayed in the chat log window to the message input window;
displaying identification information regarding the private chat participant in the message input window;
displaying the group chat and the private chat together in the chat log window;
transmitting a first message inputted in the message input window to only the private chat participant; and
in response to detecting a selection input of the identification information regarding the private chat participant in the message input window, transmitting a second messages inputted in the message input window to all participants of the group chat.

19. The method of claim 18, wherein the gesture comprises a tapping motion.

20. The method of claim 18, wherein the gesture comprises a dragging motion, and the method further comprises:
detecting by the touch screen the drag motion on the group chat window; and
designating the at least one group chat participant corresponding to the drag motion as the private chat participant, wherein the drag motion is the movement from the chat message of the at least one group chat counterpart displayed in the chat log window to the message input window.

21. The method of claim 18, wherein the identification information is at least one of identification (ID), a registered image, and registered information of the private chat participant.

22. The method of claim 18, wherein the first message is transmitted to only the private chat participant when
the identification information of the private chat participant is displayed in the message input window.

23. The method of claim 18, further comprising:
displaying by the touch screen a group chat log and a private chat log together in the chat log window,
wherein the private chat log comprises a private chat indicator which indicates that the private chat log is the private chat.

24. The method of claim 18, further comprising:
displaying by the touch screen the group chat window in which a private chat log window displaying a private chat log is included.

* * * * *